3,340,041
HERBICIDAL COMPOSITION AND METHOD EMPLOYING 4,4'-BIPYRIDYLIUM QUATERNARY SALTS

Ronald Frederick Homer, Workingham, and John Edward Downes, Bracknell, England, assignors to Imperial Chemical Industries Limited, London, England, a corporation of Great Britain
No Drawing. Filed Jan. 27, 1964, Ser. No. 340,509
Claims priority, application Great Britain, Jan. 31, 1963, 49,145/63
12 Claims. (Cl. 71—94)

This invention relates to herbicidal compositions containing as active ingredient a substituted bipyridylium salt and to processes of controlling weeds using them.

This invention comprises more particularly herbicidal compositions containing as an active ingredient a 4,4'-bipyridylium quaternary salt wherein each nitrogen atom bears an aliphatic group and at least one carbon atom in a pyridine nucleus is substituted by an alkyl group containing from 1–4 carbon atoms in admixture with a carrier. The aliphatic group linked to the nitrogen atoms may be alkyl groups containing from 1–4 carbon atoms preferably methyl or ethyl groups. Preferred salts are those in which the pyridine-ring substituents are attached to a carbon atom or atoms adjacent to either or both of the nitrogen atoms of the 4,4'-bipyridylium nucleus. Thus especially good results have been obtained with salts having the formula:

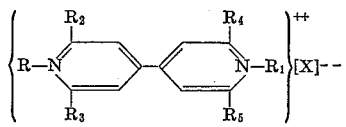

wherein R and $R_1$ are each alkyl groups containing from 1–4 carbon atoms, $R_2$, $R_3$, $R_4$ and $R_5$ are groups which include at least one methyl group the remainder being either methyl groups or hydrogen atoms and $[X]^{--}$ is the anionic part of the salt.

The anionic part of the salt may comprise for example chloride, bromide or iodide ions although $[X]^{--}$ may also comprise a single divalent ion. The choice of anion depends to a large extent upon the solubility of the respective salts in water and upon the ease with which the salts can be prepared.

Symmetrical compounds of the invention can be obtained by reacting the appropriate ring-substituted 4,4'-bipyridyl with a suitable quaternising agent. Other compounds can be prepared by a similar process in which a 1-substituted-4-(4'-pyridyl)-pyridinium salt is quaternised with a suitable quaternising agent, the pyridinium salt being chosen so that its 1-aliphatic substituent is one of the aliphatic substituents required in the bipyridylium salt, and the quaternising agent is such that it introduces the required second aliphatic substituent and anion. The reaction in some instances can be carried out simply by heating the reactants together, but it is generally more convenient, especially where the process is carried out on a large scale, to have the reactants in solution or suspension in a suitable solvent or diluent.

The compositions may be in the form of concentrated compositions which is the form in which they are transported more conveniently because they contain a high proportion of the salt with a minimum of bulk. In general these compositions are diluted before use although in certain instances, e.g. in the treatment of water weeds, this may not be necessary. Solid compositions may contain solid carriers which, depending on the use to which the compositions are to be put, may be soluble or insoluble in water. Whatever the carrier used however it should not act as a base exchange material or if soluble in water, form strongly alkaline solutions because a carrier having either property may cause partial or complete de-activation of the salt. Suitable solid carriers include magnesium sulphate, sodium sulphate, sodium acetate, potassium dihydrogen phosphate, potassium chloride, citric acid and urea. Since dry free flowing compositions are generally more convenient to handle then pastes, especially good solid compositions may be obtained by adding sufficient of an aqueous solution of the salt to a partially dehydrated salt, e.g. partially dehydrated magnesium sulphate, so that after addition has been made a solid composition is obtained which is either dry or else requires little drying. Compositions containing a soluble solid carrier may be used merely by dissolving the solids in water and then applying the resulting solution in the normal way. Solid compositions containing insoluble carriers may incorporate as a carrier vermiculite, cellulose ethers and magnesium carbonate. These compositions may preferably be applied in the form of dry, substantially dust-free granules.

In general very satisfactory compositions are obtained using a liquid carrier which, usually comprises water on account of its cheapness and suitability. Such compositions whether concentrated or dilute may include a wetter which, as in the case of the carrier, should not affect adversely the herbicidal properties of the salt. Wetting agents which are especially satisfactory include condensation products of ethylene oxide with substance having a hydrogen atom capable of reacting with the ethylene oxide, e.g. alkylated phenols, e.g. octyl phenol and nonyl phenol, sorbitan monolaurate, oleyl alcohol and cetyl alcohol. The amount of wetting agent which can be used may vary widely. For example concentrated compositions may contain from 5 to 15% by weight, while the proportions present in the dilute compositions may contain from 0.01–0.5% by weight. In either case however there are occasions when smaller or larger amounts may be used.

The amount of herbicidal salt which may be used in the compositions may also vary considerably. For concentrated compositions which may require dilution before use from 5 to 70% by weight is generally very satisfactory, whilst diluted compositions which generally are more suitable for application without further treatment usually contain from 0.002 to 2.00% by weight of the salt.

The compositions may also contain other ingredients known to the art as being suitable in the formulation of herbicides, e.g. dispersing agents, binders, stickers, corrosion inhibitors, stabilising and colouring agents. Since the compounds tend to be corrosive, especially in aqueous solution, the presence of a corrosion inhibitor is sometimes especially advantageous. Suitable inhibitors include water soluble phosphates which in aqueous solution liberate $H_2PO_4^-$ ions, e.g. dipotassium hydrogen phosphate and sodium dihydrogen phosphate. Other inhibitors which may be used are sodium molybdate, sodium metaborate and sodium benzoate.

The compositions may be applied in the usual way normally employed for applying herbicides. Solid granules or liquid compositions may be distributed in rivers, or canals to destroy water weed and ordinary spray equipment may be used in the application of liquid compositions to weeds growing on land. The time taken for the compositions to take effect varies according to the nature of the weed population, the conditions prevailing at the time of application and the amount of salt applied. In general however, most forms of weeds are either killed or severely damaged within a period of 14 days.

The invention is illustrated by the following examples.

EXAMPLE 1

This example describes the preparation of 1,2,1′,2′-tetramethyl-4,4′-bipyridylium diiodide.

2,2′-dimethyl-4,4′-bipyridyl (3 g.) was heated under reflux in 90% ethanol (50 ml.) with methyl iodide (5.5 ml.) for six hours. The crystals which had separated were then collected and recrystallised from dilute ethanol, yielding 1,2,1′,2′-tetramethyl - 4,4′ - bipyridylium diiodide as a solid product. An attempt to take the melting point of this product was unsuccessful as it did not melt below 320° C. The analysis of the product was as follows:

Found: C, 35.1; H, 3.8; N, 6.2%. $C_{14}H_{18}N_2I_2$ requires: C, 35.9; H, 3.8; N, 6.0%.

EXAMPLE 2

1,2,6,1′,2′,6′-hexamethyl-4,4′-bipyridylium diiodide was prepared by the process of Example 1 above, but using a molar equivalent amount of 2,6,2′,6′-tetramethyl-4,4′-bipyridyl instead of 2,2′-dimethyl - 4,4′ - bipyridyl. The product was obtained as a solid having no definite melting point but decomposes slowly from 280° C. upwards. The product had the following analysis:

Found: C, 37.3; H, 4.45; N, 5.8%. $C_{16}H_{22}N_2I_2$ requires: C, 37.4; H, 4.2; N, 5.45%.

EXAMPLE 3

1,2,6,1′-tetramethyl-4,4′-bipyridylium diiodide was prepared by the process of Example 1, but using a molar equivalent amount of 2,6-dimethyl-4,4′-bipyridyl instead of 2,2′-dimethyl-4,4′-bipyridyl. The product was obtained as a solid, M.P. 310° C. (decomp.) which had the following analysis:

Found: C, 35.0; H, 2.7; N, 6.25%. $C_{14}H_{15}N_2I_2$ requires: C, 35.9; H, 3.85; N, 6.0%.

The invention also includes compounds in which the aliphatic substituents on the nitrogen atoms of the 4,4′-bipyridyl nucleus are N-substituted carbamoyl alkyl radicals, and the following example describes the preparation of such a compound.

EXAMPLE 4

2,2′-dimethyl-4,4′-bipyridyl (5 g.) was heated under reflux with N,N - diethyl-2-chloracetamide (8.6 g.) at 140° C. for one hour. The resulting solid product obtained on cooling the reaction mixture was recovered and recrystallised from ethanol, yielding 1,1′-bis(diethylcarbamoylmethyl) - 2,2′ - dimethyl-4,4′-bipyridylium dichloride monohydrate. The analysis of the product was as follows:

Found: C, 57.7; H, 8.0; N, 10.2%. $C_{24}H_{36}O_2N_4Cl_2 \cdot H_2O$ requires: C, 57.4; H, 7.6; N, 11.3%.

EXAMPLE 5

Aqueous solutions were made containing varying proportions of 4,4′-bipyridylium salts the preparations of which are described in Examples 1–3 and 0.1% by weight of a wetting agent sold under the trade name "Lissapol" NX, "Lissapol" being a registered trademark. The wetter comprised a condensation product of ethylene oxide and nonyl phenol to which had been added 10% by weight of isopropanol.

The solutions were then sprayed onto a number of dicotyledons including sugar beet, mustard, kale, clover, mayweed and redshank. A number of monocotyledons, namely barley, cocksfoot, wheat and wild oats were similarly treated. It was found that after 14 days all the plants were either killed or severely damaged when treated at the rate of 2 lb. and 10 lb. per acre of active compound. The amount of salt in the solutions corresponded to solutions containing 0.02 and 0.1% by weight of salt respectively.

What we claim is:

1. A herbicidal composition comprising in admixture a herbicidally effective amount of 4,4′-bipyridylium quaternary salt wherein each nitrogen atom bears an aliphatic group and at least one carbon atom adjacent to the nitrogen atom in a pyridine nucleus is substituted by an alkyl group containing from 1–4 carbon atoms with a carrier, said salt having the formula:

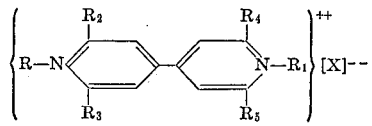

wherein R and $R_1$ are selected from the group consisting of alkyl of 1–4 carbon atoms and di-lower alkyl-carbamoylmethyl; $R_2$, $R_3$, $R_4$ and $R_5$ are hydrogen or alkyl of 1–4 carbon atoms, at least one of $R_2$, $R_3$, $R_4$ and $R_5$ being alkyl, and X is an anion.

2. A herbicidal composition according to claim 1 wherein the alkyl group is a methyl group.

3. A herbicidal composition according to claim 2 wherein at least one carbon atom in each pyridine nucleus adjacent to the nitrogen atom is substituted by a methyl group.

4. A herbicidal composition according to claim 1 wherein the carrier comprises a mixture of water and a wetter.

5. A concentrated herbicidal composition according to claim 4 containing from 5 to 70% by weight of said quaternary salt.

6. A herbicidal composition according to claim 4 containing from 5 to 15% by weight of wetter.

7. A herbicidal composition according to claim 1 containing a corrosion inhibitor selected from the group consisting of water-soluble phosphates, sodium molybdate, sodium metaborate and sodium benzoate.

8. A herbicidal composition according to claim 1 containing from 0.002 to 2.00% by weight of said quaternary salt.

9. A process of controlling weeds comprising treating said weeds with a herbicidally effective amount of a 4,4′-bipyridylium quaternary salt wherein each nitrogen atom bears an aliphatic group and at least one carbon atom in the pyridine nucleus is substituted by an alkyl group containing from 1–4 carbon atoms with a carrier, said salt having the formula

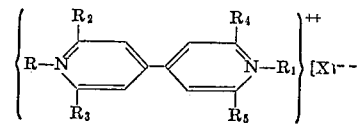

wherein R and $R_1$ are selected from the group consisting of alkyl of 1 to 4 carbon atoms and di-lower alkyl-carbamoylmethyl and $R_2$, $R_3$, $R_4$ and $R_5$ are hydrogen or alkyl of 1 to 4 carbon atoms, at least one of $R_2$, $R_3$, $R_4$ and $R_5$ being alkyl, and X is an anion.

10. A herbicidal composition comprising a herbicidally effective amount of a 4,4′-bipyridylium quaternary salt of the formula:

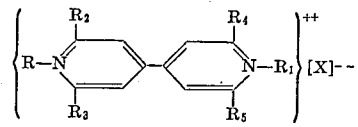

wherein R and $R_1$ are alkyl of 1–4 carbon atoms; $R_2$, $R_3$, $R_4$ and $R_5$ are hydrogen or alkyl of 1–4 carbon atoms, at least one of $R_2$ and $R_3$ and at least one of $R_4$ and $R_5$ being alkyl, and X is an anion; in admixture with a carrier and a wetting agent.

11. A herbicidal composition comprising a herbicidally effective amount of a 4,4′-bipyridylium quaternary salt selected from the group consisting of 1,2,1′,2′-tetramethyl 4,4′-bipyridylium diiodide; 1,2,6,1′,2′,6′-hexamethyl-4,4′-bipyridylium diiodide and 1,2,6,1′-tetramethyl - 4,4′ - bipyridylium diiodide, with a carrier therefor and a wetting agent.

12. A process of controlling weeds which comprises applying thereto a herbicidally effective amount of a 4,4'-bipyridylium quaternary salt selected from the group consisting of 1,2,1',2'-tetramethyl 4,4'-bipyridylium diiodide; 1,2,6,1',2',6'-hexamethyl-4,4'-bipyridylium diioxide and 1,2,6,1'-tetramethyl-4,4'-bipyridylium diiodide.

References Cited

UNITED STATES PATENTS

| 3,150,954 | 9/1964 | Wheeler | 71—2.5 |
| 3,156,551 | 11/1964 | Brian | 71—2.5 X |

LEWIS GOTTS, *Primary Examiner.*

J. O. THOMAS, JR., *Examiner.*